United States Patent
Vyas et al.

(10) Patent No.: US 7,632,592 B2
(45) Date of Patent: *Dec. 15, 2009

(54) METHOD OF FABRICATING CORROSION-RESISTANT BIPOLAR PLATE

(75) Inventors: Gayatri Vyas, Rochester Hills, MI (US); Mahmoud H. Abd Elhamid, Grosse Pointe Woods, MI (US); Youssef M. Mikhail, Sterling Heights, MI (US); Richard H. Blunk, Macomb Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1054 days.

This patent is subject to a terminal disclaimer.

(21) Appl. No.: 10/978,504

(22) Filed: Nov. 1, 2004

(65) Prior Publication Data

US 2006/0093888 A1    May 4, 2006

(51) Int. Cl.
    *H01M 2/02*    (2006.01)
(52) U.S. Cl. .............................. 429/34; 429/38; 427/115

(58) Field of Classification Search ................. 429/34; 29/623.5; 427/115, 421.1, 446, 455, 216; 428/548, 615
See application file for complete search history.

(56) References Cited

U.S. PATENT DOCUMENTS

| | | | |
|---|---|---|---|
| 6,228,522 B1 * | 5/2001 | Batawi et al. ................. 429/34 |
| 6,372,376 B1 | 4/2002 | Fronk et al. |
| 2003/0228512 A1 | 12/2003 | Vyas et al. |
| 2004/0091768 A1 | 5/2004 | Abd Elhamid et al. |
| 2004/0197593 A1 * | 10/2004 | Chellappa .................... 428/613 |
| 2005/0017055 A1 * | 1/2005 | Kurz et al. .................... 228/194 |
| 2005/0025897 A1 * | 2/2005 | Van Steenkiste et al. ..... 427/446 |
| 2006/0019142 A1 * | 1/2006 | Abd Elhamid et al. ......... 429/34 |
| 2006/0078776 A1 * | 4/2006 | Elhamid et al. ................ 429/34 |

* cited by examiner

*Primary Examiner*—Raymond Alejandro

(57) ABSTRACT

A method of fabricating a corrosion-resistant and inexpensive bipolar plate for a fuel cell is disclosed. The method includes providing a bipolar plate substrate and coating a corrosion-resistant coating on the bipolar plate substrate using a kinetic spray process.

1 Claim, 2 Drawing Sheets

METHOD OF FABRICATING CORROSION-RESISTANT BIPOLAR PLATE

TECHNICAL FIELD

The present invention relates to fuel cells, which generate electricity to power vehicles or other machinery. More particularly, the present invention relates to a method of fabricating a corrosion-resistant bipolar plate by coating the bipolar plate with a high-grade stainless steel using a kinetic or cold spray technique to impart fluoride ion resistance to the bipolar plate when used in a polymer electrolyte membrane (PEM) fuel cell.

BACKGROUND OF THE INVENTION

Fuel cells produce energy by combining hydrogen and oxygen to produce water and an end product. In a Polymer-Electrolyte-Membrane (PEM) fuel cell, a polymer membrane serves as the electrolyte between a cathode and an anode. In the PEM fuel cell, multiple fuel cells are frequently stacked in series to form a fuel cell stack. In the fuel cell stack, one side of a flow field plate serves as the anode for one fuel cell while the opposite side of the flow field plate serves as the cathode for an adjacent fuel cell. Because each flow field plate serves as both an anode and a cathode, the flow field plate is also known as a bipolar plate.

Conventionally, fuel cell manufacturers have used Poco graphite bipolar plates, which are electrically-conducting and resistant to corrosion in the fuel cell environment. However, graphite plates are brittle, and therefore, difficult to machine. This adds to the cost of the bipolar plates and volumetric power density of the fuel cell stack. While the use of metal bipolar plates is advantageous, metals such as titanium and 316L stainless steel, which can be easily machined, are easily attacked by fluoride ions in a fuel cell environment.

While 316L stainless steel exhibits a fair corrosion resistance to fluoride ions, the corrosion rate increases with increases in the fluoride ion leach out rate. Furthermore, it is well known that the fluoride corrosion resistance increases with the increase in the molybdenum content of the stainless steel alloy. This problem can be mitigated somewhat by removing the hydrogen fluoride from the fuel cell environment or by using higher grades of stainless steel which are more resistant to corrosion by fluoride ions than 316L stainless steel. However, the use of higher grades of stainless steel for the bipolar plate tends to increase the cost of the bipolar plate. Furthermore, incorporating higher-grade stainless steel into bipolar plates having the required thickness adds a significant cost to the bipolar plates that can exceed the cost of the stainless steel itself.

Various methods are known for increasing the corrosion resistance of a corrosion-susceptible substrate. For example, US20030228512 A1 discloses a method of improving the contact resistance of the surface of a stainless steel substrate while maintaining optimum corrosion resistance of the substrate by depositing a gold coating on the substrate. US20040091768 A1 discloses a method of increasing the corrosion resistance of a substrate by providing a polymeric conductive coating on the substrate. U.S. Pat. No. 6,372,376 B1 discloses a method of increasing the corrosion resistance of a substrate by providing an electrically-conductive, corrosion-resistant polymer containing a plurality of electrically conductive, corrosion-resistant filler particles on the substrate.

Coating the surface of a lower grade stainless steel bipolar plate, such as a 304 L or 316L stainless steel bipolar plate, for example, with a thin layer of high-grade stainless steel or alloy using a kinetic or cold spray process imparts a high degree of fluoride ion corrosion resistance to the bipolar plate while maintaining the cost of the bipolar plate within acceptable levels. Furthermore, a kinetic or cold spray process can be used to deposit a corrosion-resistant layer having a thickness of up to 25 microns or more.

SUMMARY OF THE INVENTION

The present invention is generally directed to a novel method of fabricating a bipolar plate which is characterized by enhanced stability and resistance to fluoride ion corrosion in a fuel cell. The bipolar plate fabrication method of the present invention includes providing a stainless steel bipolar plate substrate which is typically a low-grade stainless steel, such as 304L or 316L, for example, and forming a corrosion-resistant coating, which is a higher-grade stainless steel or alloy, on the bipolar plate substrate using a kinetic or cold spray technique. The corrosion-resistant coating may be a high-grade stainless steel such as C-276, for example. Other alloys such as 904L, 254SMO and Carp-20, for example, can also be used as coating materials. Accordingly, the corrosion-resistant coating renders the lower-grade stainless steel bipolar plate substrate substantially resistant to fluoride ions in the fuel cell environment. This substantially prolongs the lifetime of the bipolar plate. A cover layer, which may be gold or an organic coating, for example, may be provided on the corrosion-resistant coating to reduce the contact resistance of the corrosion-resistant coating.

BRIEF DESCRIPTION OF THE DRAWINGS

The invention will now be described, by way of example, with reference to the accompanying drawings, in which.

DESCRIPTION OF THE PREFERRED EMBODIMENTS

Figure 1:
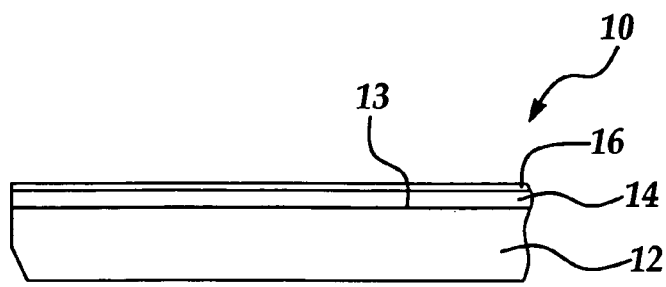
FIG. 1 is a cross-section of a portion of an enhanced stability bipolar plate fabricated by a kinetic/cold spray process according to the present invention.

According to the present invention, a bipolar plate substrate, which is a low-grade stainless steel such as 304L or 316L stainless steel, for example, is coated with a higher grade of stainless steel using a kinetic or cold spray process to fabricate a bipolar plate having an improved corrosion resistance to hydrogen fluoride. Preferably, the anode side of the bipolar plate substrate is coated with a corrosion-resistant coating using a kinetic or cold spray process to increase the resistance of the cathode side of the bipolar plate to corrosion by fluoride ions during operation of a fuel cell. Coating the surface of a low-grade stainless steel bipolar plate substrate with a thin (0.1~2 µm) corrosion-resistant coating of the higher-grade C-276, for example, significantly lowers the corrosion rate of the bipolar plate in a fluoride ion environment while not adding significant cost to the bipolar plate.

Alloys which may be coated on the bipolar plate substrate as the corrosion-resistant coating include 904L, 254SMO or Carp-20 stainless steel, for example.

The contact resistance of the thermally-sprayed stainless steel coating can be minimized by providing a cover layer on the stainless steel coating. The cover layer may be a thin layer (<10 nm) of gold (Au) or an organic coating, for example. Other suitable materials for the cover layer include platinum and its alloys, rhodium, ruthenium and its alloys, and palladium and its alloys. Coating a lower-grade stainless steel or material with a higher-grade stainless steel or material using a kinetic cold spray process according to the invention is cost-effective, since fabricating a bipolar plate using a higher-grade stainless steel or material is cost-prohibitive.

A kinetic spray or cold spray process uses energy stored in high-pressure compressed gas to propel fine powder particles at very high velocities (500~1,500 m/s) against a substrate to deposit a material layer on the substrate. In the process, compressed gas, typically helium, is fed through a heating unit and then to a gun, where the gas exits as a high-velocity gas jet through a specially-designed nozzle (such as a laval-type nozzle, for example). Compressed gas is simultaneously fed through a high-pressure powder feeder and into the gun, respectively, to introduce powder particles into the high-velocity gas jet. The powder particles are accelerated and moderately heated to a certain velocity and temperature where, on impact with the substrate, the particles deform and bond to form a coating on the substrate.

The accelerated particles remain in the solid state and are relatively cold, so the bulk reaction of the particles with the substrate on impact is solid state only. Because the process imparts little to no oxidation to the spray material, the surfaces remain clean, aiding in bonding. The absence of melting and the use of relatively low temperatures during the process result in very low shrinkage of the particles on cooling. Moreover, due to the high strain induced on the particles upon impact with the substrate, the coatings tend to be stressed in compression and not in tension as is the case in the liquid/solid state reactions of most other thermal spray processes. Low temperatures also aid in retaining the original powder chemistry and phases in the coating.

Bonding of the particles with the substrate relies on sufficient energy to cause significant plastic deformation of the particles and the substrate. Under the high-impact stresses and strains of impact, interaction of the particle and substrate surfaces may cause disruption of oxide films, promoting contact of chemically-clean surfaces and generating high friction. This generates a very high degree of localized heating, promoting bonding similar to friction- or explosive-welding.

Referring initially to FIG. 1, a cross-sectional view of an enhanced stability bipolar plate 10, hereinafter bipolar plate, according to the present invention is shown. The bipolar plate 10 includes a bipolar plate substrate 12 which is typically a low-grade stainless steel such as 304L or 316L stainless steel, for example. A corrosion-resistant coating 14, which may be a grade of stainless steel or alloy higher than that of the bipolar plate substrate 12, is formed on the outer surface 13 of the bipolar plate substrate 12 using a kinetic or cold spray process, which will be hereinafter further described. The corrosion-resistant coating 14 preferably has a thickness of typically about 0.1~2 μm. However, it is understood that corrosion-resistant coatings 14 having a thickness which exceeds 25 μm may be formed on the bipolar plate substrate 12, as desired, using a kinetic or cold spray process according to the present invention. Grades of stainless steel which are suitable for the corrosion-resistant coating 14 include C-276 ss, for example. Alternatively, the corrosion-resistant coating 14 may be an alloy such as 904L, 254SMO or Carp-20, for example.

A cover layer 16, which may be gold (Au) or an organic material, for example, may be provided on the corrosion-resistant coating 14 to keep the contact resistance of the corrosion-resistant coating 14 low. Other suitable materials for the cover layer 16 include platinum and its alloys, rhodium, ruthenium and its alloys, and palladium and its alloys. The thickness of the cover layer 16 is preferably less than typically about 10 nm in the case of gold coatings and typically about 10~28 micrometers in the case of polymeric coatings.

Figure 2:
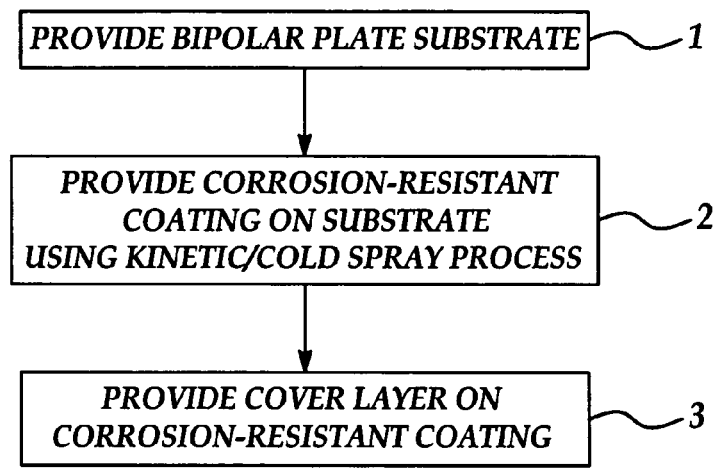
FIG. 2 is a flow diagram illustrating sequential process steps carried out according to a kinetic/cold spray process of fabricating the enhanced stability bipolar plate of the present invention.

FIG. 2 is a flow diagram which illustrates sequential process steps carried out to fabricate an enhanced stability bipolar plate using a kinetic or cold spray process according to the present invention. In step 1, a bipolar plate substrate is provided. The bipolar plate substrate is typically a low-grade stainless steel such as 304L or 316L, for example, and has the suitable size and configuration for use in a fuel cell stack of a fuel cell. The bipolar plate substrate includes lands and gas flow channels which facilitate the flow of reactant and product gases in an assembled fuel cell, as is known by those skilled in the art.

In step 2, a corrosion-resistant coating is formed on the outer surface of the bipolar plate substrate. The thickness of the corrosion-resistant coating is preferably in the range of typically about 0.1~2 μm. However, it is understood that the corrosion-resistant coating may have a thickness which exceeds 25 μm, as desired. The corrosion-resistant coating may be a grade of stainless steel or alloy which is higher than that of the bipolar plate substrate, including, for example, C-276 stainless steel. Alternatively, the corrosion-resistant coating may be a corrosion-resistant alloy such as 904L, 254SMO or Carp-20, for example. The corrosion-resistant coating is coated onto the exterior surface of the bipolar plate substrate using a kinetic or cold spray process, which will be hereinafter further described.

In step 3, a cover layer is deposited on the corrosion-resistant coating to minimize the contact resistance of the corrosion-resistant layer. The cover layer preferably has a thickness of less than typically about 10 nm. The cover layer may be, for example, gold (Au) or an organic material and has a thickness of preferably less than typically about 10 nm in the case of gold coatings and typically about 10~28 micrometers in the case of polymeric coatings. Other suitable materials for the cover layer include platinum and its alloys, rhodium, ruthenium and its alloys, and palladium and its alloys. The cover layer may be formed on the corrosion-resistant layer using a conventional physical vapor deposition (PVD) technique, for example.

Table (I) below presents the actual corrosion rates and the normalized corrosion rates for various grades of stainless steel, alloys and titanium. The corrosion rate and normalized corrosion rate of each sample was obtained by soaking the sample in an etching solution (1M $H_2SO_4$+0.1 M HF) for an hour at 80 degrees C.

TABLE I

| Alloy | Corrosion rate (g/s) | Normalized corrosion rate |
|---|---|---|
| 304L ss | 8.87E−05 | 1 |
| 353 ss | 2.62E−05 | 0.296 |
| 316L ss | 1.89E−05 | 0.213 |
| Inconl 800 | 1.85E−05 | 0.208 |

TABLE I-continued

| Alloy | Corrosion rate (g/s) | Normalized corrosion rate |
|---|---|---|
| 317L ss | 8.19E−06 | 0.092 |
| Inconl 601 | 5.97E−06 | 0.067 |
| 904L ss | 7.50E−07 | 0.009 |
| 254SMO | 4.17E−07 | 0.005 |
| Carp-20 | 3.61E−07 | 0.004 |
| C-276 | 1.39E−07 | 0.002 |
| Titanium | 8.13E−05 | 0.92 (Limited stability in fluoride ion containing environments) |

Figure 3:
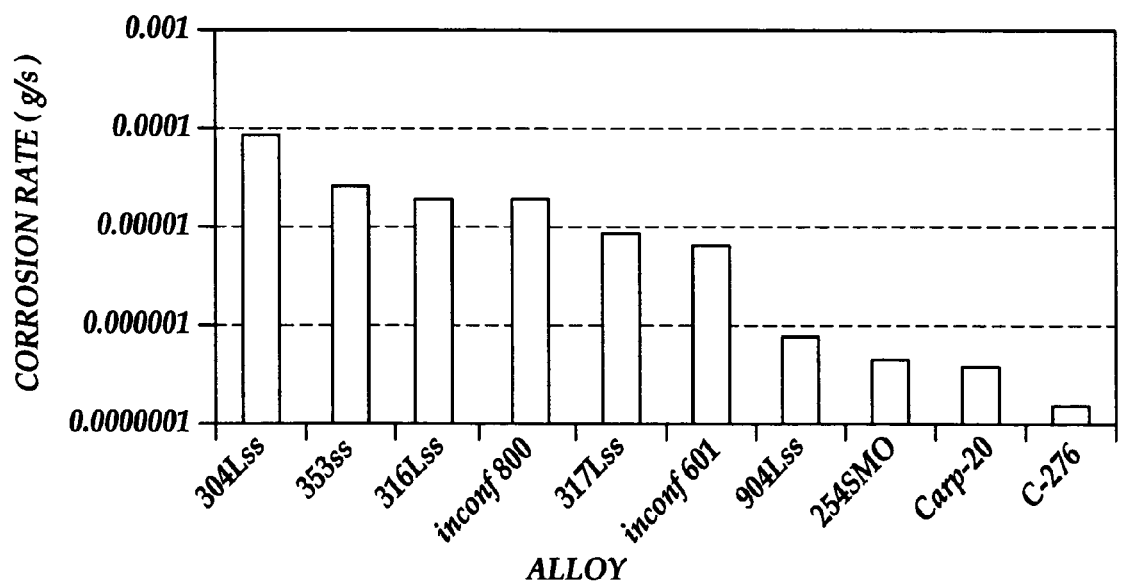
FIG. 3 is a bar graph which compares the corrosion rates (plotted along the Y-axis) of various stainless steel alloys (plotted along the X-axis)

Table (I) above shows that the higher the grade of stainless steel/alloy, the better the corrosion resistance of the stainless steel/alloy in a sulfuric acid/hydrogen fluoride mixture. The corrosion resistance of titanium in the same solution is comparable to that of 304L stainless steel. The bar graph of FIG. 3 presents a visual comparison of the corrosion rates of various grades of stainless steel and various alloys.

Figure 4:
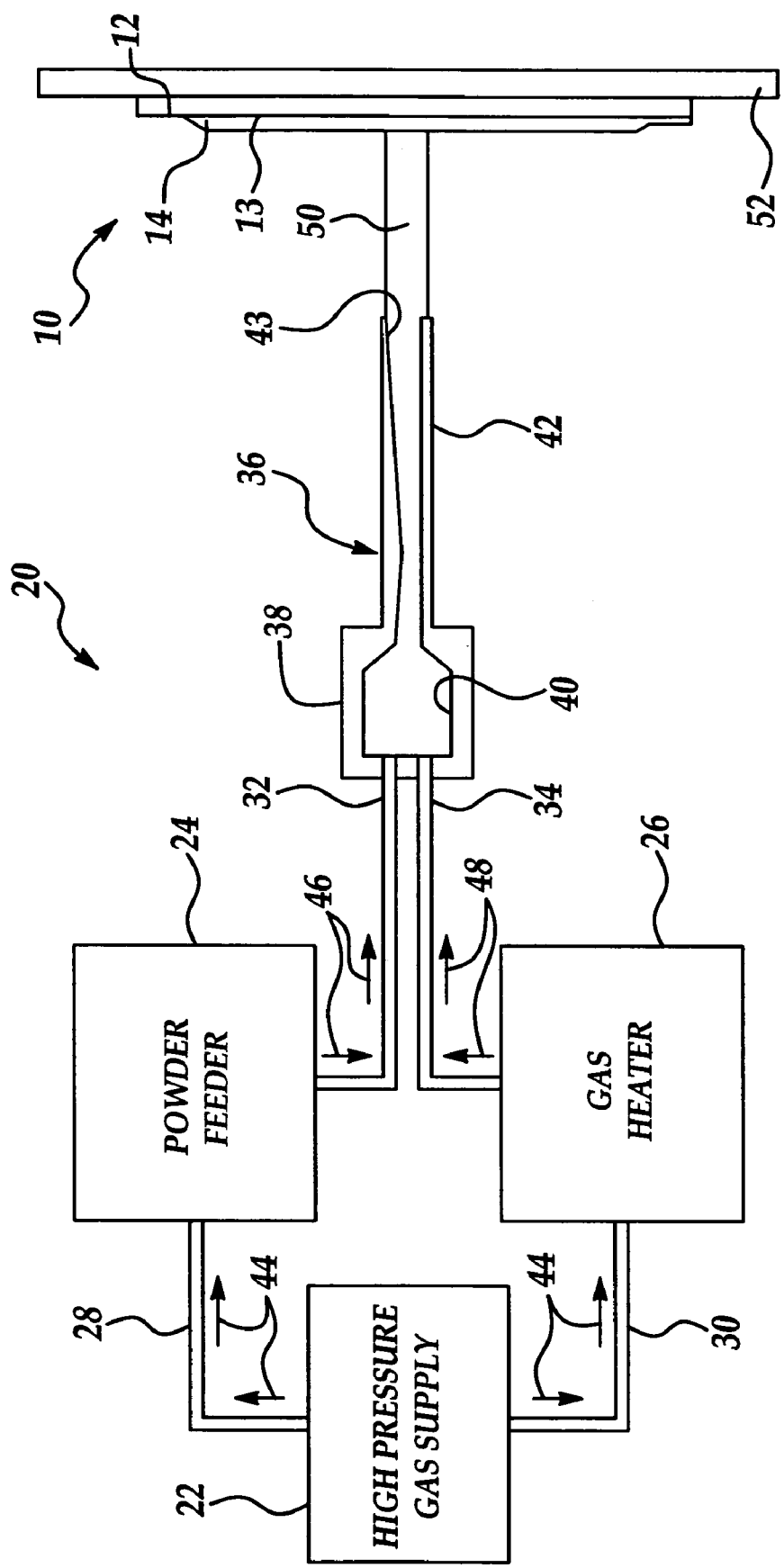
FIG. 4 is a schematic view of a kinetic cold spray apparatus used in a kinetic/cold spray process to fabricate an enhanced stability bipolar plate according to the present invention.

Referring next to FIG. 4, a kinetic or cold spray process used to form the corrosion-resistant coating 14 on the bipolar plate substrate 12 according to the present invention may be carried out using a kinetic spray apparatus 20, which may be conventional. The kinetic spray apparatus 20 typically includes a gun 36 which includes a mixing chamber 38 having a chamber interior 40. An elongated barrel 42 having a nozzle 43, such as a laval-type nozzle, for example, extends from the mixing chamber 38. A substrate support 52 is positioned in spaced-apart relationship with respect to the gun nozzle 43.

A powder feeder 24, which contains a supply of stainless steel powder particles (not shown), for example, is disposed in fluid communication with the mixing chamber 38 of the gun 36 through a gas/powder feed conduit 32. In like manner, a gas heater 26 is disposed in fluid communication with the mixing chamber 38 of the gun 36 through a heated gas feed conduit 34. A compressed gas supply 22, which contains a pressurized inert gas such as helium, for example, is disposed in fluid communication with the powder feeder 24 through a gas feed conduit 28 and with the gas heater 26 through a separate gas feed conduit 30.

In use of the kinetic spray apparatus 20 according to the process of the present invention, the bipolar plate substrate 12 is initially mounted on the substrate support 52, with the outer surface 13 of the bipolar plate substrate 12 facing the gun nozzle 43. Powder particles of the stainless steel or alloy to be used as the corrosion-resistant coating 14 are initially placed in the powder feeder 24. The powder particles may be particles of C-276 grade stainless steel or particles of an alloy such as 904L, 254SMO or Carp-20, for example. Preferably, the powder particles have a size of 1 to 50 μm.

Compressed gas 44, such as helium, for example, is then continually distributed from the compressed gas supply 22, through the gas feed conduit 30 to the heater 26, respectively, where the compressed gas 44 is heated to a temperature of preferably about 0 to 700° C. Through the heated gas feed conduit 34, heated gas 48 is continually distributed from the gas heater 26 and into the chamber interior 40 in the mixing chamber 38 of the gun 36.

As the compressed gas 44 is distributed through the gas heater 26 and to the mixing chamber 38 of the gun 36, compressed gas 44 is also distributed from the compressed gas supply 22, to the powder feeder 24 through the gas feed conduit 28. The compressed gas 44 mixes with the powder particles in the powder feeder 24, and a gas/powder mixture 46 is distributed through the gas/powder feed conduit 32 and into the chamber interior 40 in the mixing chamber 38 of the gun 36.

In the mixing chamber 38 of the gun 36, the heated gas 48 mixes with the gas/powder mixture 46. The resulting gas/particle stream 50 is ejected from the gun nozzle 43 and against the outer surface 13 of the bipolar plate substrate 12 at a velocity of typically about 500~1,500 m/s. Upon impact with the outer surface 13 of the bipolar plate substrate 12, the powder particles deform and bond with the outer surface 13 and with each other to form the corrosion-resistant coating 14. In subsequent process steps, the cover layer 16 (FIG. 1) may be coated on the corrosion-resistant coating 14 using a PVD (physical vapor deposition) or other deposition technique known to those skilled in the art.

While the preferred embodiments of the invention have been described above, it will be recognized and understood that various modifications can be made in the invention and the appended claims are intended to cover all such modifications which may fall within the spirit and scope of the invention.

The invention claimed is:

1. A method for enhancing corrosion resistance of a bipolar plate, comprising:
   providing a bipolar plate substrate having a first corrosion-resistance; and coating a corrosion-resistant coating on said bipolar plate substrate using a kinetic/cold spray process, and wherein the corrosion-resistant coating has a second corrosion-resistance that is greater than the first corrosion-resistance; wherein the bipolar plate includes lands and flow channels to facilitate the flow of reactant and product gasses in the fuel cell.

* * * * *